June 13, 1939.　　　　S. A. SNELL　　　　2,162,593
MECHANISM CONTROL
Filed July 7, 1936
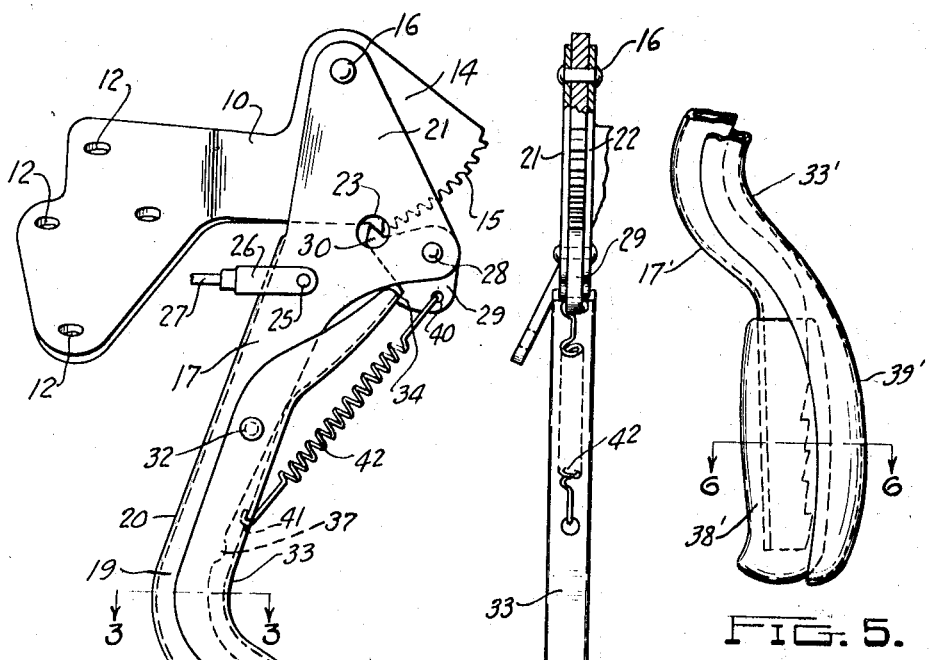
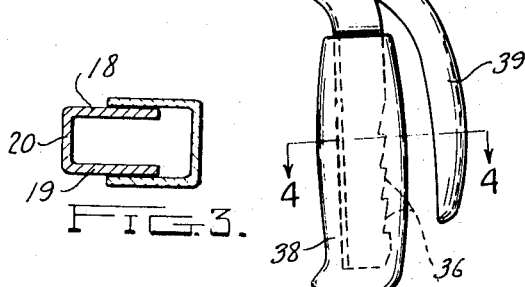
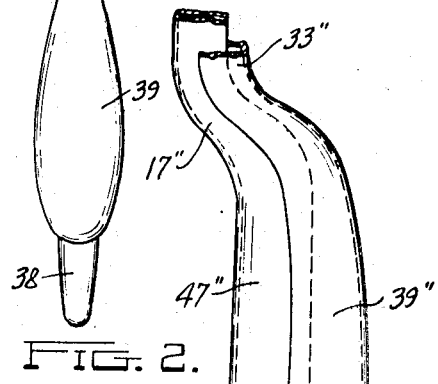
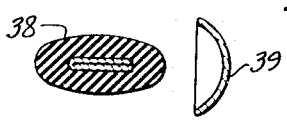
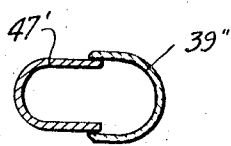
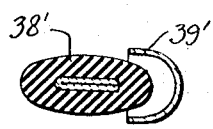
INVENTOR
*Samuel A. Snell*
BY
*Braselton, Whitcomb & Davis*
ATTORNEY Patented June 13, 1939

2,162,593

UNITED STATES PATENT OFFICE 2,162,593

MECHANISM CONTROL

Samuel A. Snell, Toledo, Ohio, assignor, by mesne assignments, to The Logan Gear Company, a corporation of Ohio Application July 7, 1936, Serial No. 89,344

7 Claims. (Cl. 74—537)

This invention relates to mechanism control and especiallly to lever mechanism of a character suitably adapted for vehicle control or other apparatus.

The invention contemplates the provision of mechanism control embodying a clutching means for positively holding or retaining a lever or member in a desired position.

The invention has for an object the provision of a lever and clutch arrangement especially adapted for controlling braking mechanism of an automotive vehicle, the clutching mechanism of the lever being capable of positively retaining the lever in adjusted position yet the clutch releasing means being of simple construction for readily effecting release of the clutch mechanism without undue effort on the part of the vehicle operator.

Another object is the provision of an emergency brake operating control embodying a clutch releasing means coextensively arranged with a lever body and arranged to cover or obscure from view portions of the lever body, thus eliminating the necessity of applying a fine finish to portions of the mechanism.

Another object of the invention is the provision of an emergency brake controlling lever system arranged to be mounted at the rear of the instrument panel of a vehicle whereby the mechanism is in a convenient position to be manipulated by the vehicle operator.

A further object of the invention is the provision of a lever member having a grip portion of nonmetallic material and a lever clutch releasing means coextensively arranged with the lever and the grip portion.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a mechanism control of my invention adapted for mounting at the rear of the instrument board of the vehicle;

Figure 2 is a front elevational view of the arrangement shown in Figure 1;

Figure 3 is a transverse sectional view taken substantially on the line 3—3 of Figure 1;

Figure 4 is a transverse sectional view taken substantially on the line 4—4 of Figure 1;

Figure 5 is a fragmentary side elevational view showing the lower end of the lever and clutch releasing means of modified form;

Figure 6 is a transverse sectional view taken substantially on the line 6—6 of Figure 5;

Figure 7 is a view similar to Figure 5 showing a further modified form of lever and clutch releasing means;

Figure 8 is a cross sectional view taken substantially on the line 8—8 of Figure 7.

While I have illustrated the arrangement of my invention as utilized for controlling the emergency brakes of a vehicle, it is understood that I contemplate the utilization of the mechanism control of my invention wherever the same may be found to be applicable.

Referring to the drawing in detail, I have illustrated a form of the invention in which a support or bracket 10 is adapted to be secured to a vehicle structure, preferably adjacent the dash board of a vehicle and to the rear of the instrument panel (not shown). The support 10 is provided with openings 12 adapted to receive rivets, screws, or other securing means for holding the bracket to the vehicle structure. The plate or support 10 is preferably provided with a vertically arranged uniplanar portion 14 having a lower edge portion serrated or grooved to form a series of ratchet or clutch teeth 15.

Pivotally connected to the uniplanar portion 14 by means of a pin 16 is a lever or lever member 17 preferably formed of sheet metal. As illustrated, the lever member is of U-shaped configuration in cross section having side wall portions 18 and 19 connected by web portion 20, which configuration lends stiffness and rigidity to the construction. The web portion 20 terminates just beneath the lower edge of the uniplanar portion 14 whereby the upper part of the lever member is formed with two side wall projecting portions 21 and 22 which are adapted to straddle the uniplanar portion 14. The lever member is provided with an opening to receive a pin 25 passing through a clevis member 26 which in turn is connected to a cable 27 adapted to be operatively connected to the emergency brakes of the vehicle.

The projecting portions 21 and 22 are also provided with registering openings adapted to receive a pin 28, and journalled or pivoted upon said pin intermediate the projections 21 and 22 is a pawl or clutch member 29 having a projection 30 adapted for cooperation with the ratchet teeth 15 of the uniplanar portion 14 of the support 10.

The side wall portions 18 and 19 of the lever member are provided with registering openings to receive a pin 32 which serves to pivotally connect a clutch or pawl actuating or releasing member 33 preferably formed of sheet metal and of U-shaped cross section for purposes of strength and rigidity. The pawl or clutch member 29 is also provided with a projection or ledge 34 which is adapted to contact the upper extremity of the clutch manipulating or releasing member 33 as illustrated in Figure 1. The lever member and the clutch actuating member are curved as illustrated in Figure 1 at their intermediate portions to accommodate the instrument panel of the vehicle when the mechanism control is moved to brake setting position. I have further provided in the side wall of projection 21 an opening 23 so positioned as to render the pawl tooth 30 and its engagement with the ratchet teeth visible through the opening. One of the purposes of this opening is to provide a visual means for inspection in order to determine that the pawl projection and the ratchet teeth are in proper cooperative relation.

In the form of the invention illustrated in Figures 1 to 4 inclusive, the lower extremity of the U-shaped configuration of the lever member may be formed with the side wall portions 18 and 19 in close proximity and the juxtaposed edges of the U-shaped configuration provided with serrations or notches forming teeth 36 preferably of ratchet configuration. In this form I have provided a separate grip member 38 which may be of moulded rubber or plastic material preferably preformed and which may be received upon the extremity of the lever member, the grip member being held in place by reason of the opening being of slightly smaller dimension than the lever and the teeth formed by serrations 36 in the lever member engaging an inner wall of the grip member. The clutch actuating member terminates in a convex manipulating or hand grip portion 39 adjacent the grip portion of the lever member.

Spring means are provided for urging the pawl or clutch member 29 into cooperative engagement with the ratchet teeth 15. As illustrated, the pawl member 29 is provided with an opening 40 and the clutch manipulating member is provided with an opening 41, these openings being adapted to receive and accommodate the hook like extremities of a tension spring 42. The spring means not only serves to urge the pawl at all times into engagement with the ratchet teeth 15, but through the interconnection of the spring with the clutch manipulating member 33, a tension is at all times placed upon the clutch or pawl releasing member and the pawl member 29 so as to prevent rattling or noises because of slight relative movement of the parts due to vibrations arising during operation of the vehicle.

The mechanism control is illustrated in Figure 1 as in brake released position. When it is desired to "set" the brakes, the operator of the vehicle grasps the grip member 38 swinging the lever member about the pivot pin 16 in a counterclockwise direction as viewed in Figure 1, causing the projection 30 of the pawl or clutch member 29 to move successively over the ratchet teeth 15 until the brake is in "set" position, the pawl projection 30 engaging one of the teeth to prevent return of the lever member. When it is desired to release the brakes, the operator grasps the grip member 38 and the grip or hand portion 39 of the clutch releasing member 33 pressing member 39 towards 38 and thus causing the upper extremity of the clutch releasing member in engagement with the ledge 34 of the pawl 29 to withdraw the pawl tooth 30 from engagement with the ratchet teeth 15 against the tension of spring 42. The movement of member 39 towards 38 is limited by the engagement of the inner wall of member 33 with a projection or stop 37 preferably formed on the side walls of lever member 17. A clockwise movement of the lever member about its pivotal support may then be had as the pawl member is held out of engagement with the ratchet teeth and the brakes thus released.

In the form of the invention shown in Figures 5 and 6 the lower portion 39' of the clutch releasing member 33' is of semi-circular configuration in cross section as shown in Figure 6 and partially surrounds or embraces the forward portion of the grip member 38' of lever member 17', there being sufficient clearance between the inner wall of the hand portion of the clutch releasing member 33' and the grip portion 38' to cause the pawl to be withdrawn from the ratchet teeth as above described in connection with the form of the invention shown in Figures 1 through 4.

Figures 7 and 8 illustrate a further form of the invention wherein the lower extremity of the U-shaped configuration of the lever member 17" is so continued as to form a hand grip portion 47" as shown in cross section in Figure 8. The clutch releasing member 33" in this form of the invention is provided with a curved hand manipulating portion 39" which partially surrounds the grip portion 47". As the clutch releasing member normally obscures from view the edges of the U-shaped configuration of the lever member and the grip portion thereof, it has been found to be unnecessary to impart a fine finish to the lever member and especially as the only portions of the mechanism control visible to occupants of the vehicle are the lower extremities of the lever member and the hand portion of the clutch releasing member.

In the forms of the invention herein I have found it highly advantageous to utilize a lever member of the second class or order which permits of a maximum application of power to the braking system with a comparatively short lever member. With this type of lever the ratchet clutch mechanism being arranged below the fulcrum or pivotal support of the lever makes possible the use of ratchet teeth of a size and space practicable for a mechanism control of this character.

It is apparent that within the scope of the invention modifications and different arrangements may be made other than is herein disclosed, and the present disclosure is illustrative merely, the invention comprehending all variations thereof.

What I claim is:

1. In combination, a mechanism control including a support having a plurality of teeth formed thereon; a lever member connected to said support, said lever member formed of sheet metal to U-shaped configuration and terminating at its lower end in a hand grip portion; a pawl pivotally carried by said lever member and arranged for cooperation with the teeth on said support; a pawl manipulating member engageable with said pawl and having a portion terminating adjacent the grip portion of said lever member; and resilient means engaging said manipulating and pawl members for normally urging said pawl into engagement with the teeth on said support.

2. In combination, a mechanism control including a support having a serrated portion; a lever member formed of sheet metal having portions straddling said support and connected thereto; a pawl carried by said lever member and engageable with the serrated portion of said support; a pawl releasing means formed of sheet metal of substantially U-shaped cross section throughout the major portion of its length associated with said lever member, said pawl releasing means having a hand grip portion adjacent the lower portion of said lever member; a ledge formed on said pawl engageable with said pawl releasing member; and resilient means engaging the pawl releasing means for normally urging said pawl releasing member to one position.

3. In combination, a mechanism control including a support having a serrated portion; a lever member formed of sheet metal having portions straddling said support and pivotally connected thereto; a pawl pivotally carried by said lever member and engageable with the serrated portion of said support; a pawl releasing member of substantially U-shaped cross section throughout the major portion of its length pivotally connected to said lever member, said pawl releasing means having a hand grip portion adjacent the lower portion of said lever member; a ledge on said pawl engageable with said pawl releasing member; and resilient means engaging said pawl releasing member for normally urging the same to one position.

4. In combination, a mechanism control including a support having a serrated portion; a lever member formed of sheet metal having portions straddling said support and pivotally connected thereto; pawl means pivotally carried by said lever member and engageable with the serrated portion of said support; a pawl releasing member of substantially U-shaped cross section throughout the major portion of its length pivotally connected to said lever member, said pawl releasing means having a hand grip portion adjacent the lower portion of said lever member; a ledge on said pawl means engageable with said pawl releasing member; and spring means connecting said pawl releasing member and said pawl means for normally urging the latter into engagement with the serrated portion of said support.

5. In combination, a mechanism control including a support having a plurality of teeth on one edge thereof; a lever member pivotally connected to said support; a grip portion of moulded material secured to the depending extremity of said lever member; pawl means carried by said lever member and arranged for cooperation with the teeth on said support; a manipulating member for actuating said pawl means and having a portion terminating adjacent the grip portion of said lever member; and resilient means engaging said pawl and manipulating member for normally urging said pawl means into engagement with the teeth upon said support.

6. A vehicle brake mechanism control including a support; said support carrying a clutching surface having downwardly extending ratchet teeth; a sheet metal lever member of substantially U-shaped configuration through a major portion of its length, said lever member having projecting spaced side wall portions straddling said support and pivotally connected thereto; pawl means positioned between the side walls of the lever member and pivotally connected to the lever member, said pawl means adapted for cooperation with the ratchet teeth to retain the lever in adjusted position; a pawl releasing member pivotally connected to said lever member, said pawl releasing member being formed of sheet metal of U-shaped configuration throughout a major portion of its length, the side walls of the lever member and pawl releasing member overlapping at their U-shaped configuration; and spring means interposed between said pawl and said pawl releasing means for urging said pawl means into engagement with the ratchet teeth of said support.

7. A brake controlling mechanism for vehicles including a support; said support carrying a serrated clutching surface with the teeth extending downwardly; a lever member formed of sheet metal to substantially U-shaped configuration throughout a major portion of its length, said lever member having parallel wall portions straddling said support and pivotally connected thereto; a pawl pivoted to said lever member and adapted for cooperation with the serrated clutching surface; a pawl releasing member formed of sheet metal to U-shaped configuration throughout a major portion of its length, the side walls of said lever member and said pawl releasing member overlapping; said pawl releasing member being fulcrumed intermediate its ends upon said lever member through the overlapping wall portions, the lower extremities of the lever member and the pawl releasing member terminating in hand grip portions; and resilient means connecting said pawl and said pawl releasing member for urging the pawl into cooperative engagement with the serrated clutching surface carried by said support.

SAMUEL A. SNELL.

CERTIFICATE OF CORRECTION.

Patent No. 2,162,593.  June 13, 1939.

SAMUEL A. SNELL.

It is hereby certified that error appears in the printed specification of the above numbered patent requiring correction as follows: Page 3, first column, lines 38 and 39, claim 4, strike out the syllable and words "por- one edge thereof; a lever member" and insert instead portions straddling said support and; and that the said Letters Patent should be read with this correction therein that the same may conform to the record of the case in the Patent Office.

Signed and sealed this 1st day of August, A. D. 1939.

Henry Van Arsdale,
Acting Commissioner of Patents.

(Seal)